United States Patent
Poeppelmann

(10) Patent No.: US 12,238,090 B2
(45) Date of Patent: Feb. 25, 2025

(54) DEVICES AND METHODS FOR AUTHENTICATION

(71) Applicant: Infineon Technologies AG, Neubiberg (DE)

(72) Inventor: Thomas Poeppelmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 327 days.

(21) Appl. No.: 17/186,450

(22) Filed: Feb. 26, 2021

(65) Prior Publication Data

US 2021/0273939 A1 Sep. 2, 2021

(30) Foreign Application Priority Data

Feb. 27, 2020 (DE) .......................... 102020202532.0

(51) Int. Cl.
*H04L 9/40* (2022.01)
*H04L 9/32* (2006.01)

(52) U.S. Cl.
CPC ........ *H04L 63/0853* (2013.01); *H04L 9/3236* (2013.01); *H04L 63/0442* (2013.01)

(58) Field of Classification Search
CPC ............... H04L 63/0853; H04L 9/3236; H04L 63/0442
See application file for complete search history.

(56) References Cited

U.S. PATENT DOCUMENTS

| | | | | |
|---|---|---|---|---|
| 8,065,517 | B2 * | 11/2011 | Cizas ...................... | G06F 21/76 713/156 |
| 8,301,833 | B1 * | 10/2012 | Chen ........................ | G06F 3/065 710/10 |
| 10,375,043 | B2 * | 8/2019 | Amulothu ............... | H04L 63/06 |
| 10,404,476 | B1 * | 9/2019 | Jackson ............... | H04L 63/0428 |
| 10,462,112 | B1 * | 10/2019 | Makmel ............... | H04L 63/0435 |
| 10,671,530 | B1 * | 6/2020 | Peer ..................... | G06F 12/1408 |
| 10,715,318 | B2 * | 7/2020 | Charters ............... | H04L 9/3247 |
| 11,516,207 | B2 * | 11/2022 | Asher ................... | H04L 9/3247 |

(Continued)

FOREIGN PATENT DOCUMENTS

DE 102014108221 A1 12/2014

OTHER PUBLICATIONS

Suh, G. Edward, and Srinivas Devadas. "Physical unclonable functions for device authentication and secret key generation." Proceedings of the 44th annual design automation conference. 2007, p. 9-14 (Year: 2007).*

(Continued)

*Primary Examiner* — Han Yang
(74) *Attorney, Agent, or Firm* — Banner & Witcoff Ltd.

(57) ABSTRACT

A device comprises a receive device which is designed to receive a data packet from a communication partner. The device comprises a data processing device which is configured to process the data packet in order to obtain a secret (e.g. predetermined) value. The device further comprises a transmit device which is designed to transmit a transmit message comprising information based on the secret value to the communication partner. The device further comprises an authentication device which is designed to receive a challenge message and to use the secret value to create a response message. The transmit device is designed to create the transmit message in such a way that it comprises the response message.

28 Claims, 12 Drawing Sheets

(56) References Cited

U.S. PATENT DOCUMENTS

| | | | |
|---|---|---|---|
| 2004/0143734 A1* | 7/2004 | Buer | H04L 63/0485 |
| | | | 713/153 |
| 2006/0204004 A1 | 9/2006 | Shankar et al. | |
| 2011/0081016 A1* | 4/2011 | Kargl | H04L 9/3271 |
| | | | 235/492 |
| 2011/0219235 A1* | 9/2011 | Takahashi | G06F 16/00 |
| | | | 713/176 |
| 2014/0136840 A1* | 5/2014 | Spalka | H04L 9/14 |
| | | | 713/165 |
| 2014/0153575 A1* | 6/2014 | Munoz | H04L 45/742 |
| | | | 370/392 |
| 2015/0318998 A1 | 11/2015 | Erlikhman et al. | |
| 2015/0371214 A1* | 12/2015 | Schröder | H04L 63/0853 |
| | | | 705/44 |
| 2016/0182463 A1* | 6/2016 | Suram | H04L 63/205 |
| | | | 713/153 |
| 2017/0208463 A1* | 7/2017 | Brand | H04W 12/06 |
| 2017/0250967 A1* | 8/2017 | Martineau | H04L 63/0853 |
| 2017/0257367 A1 | 9/2017 | Han et al. | |
| 2018/0167208 A1* | 6/2018 | Le Saint | H04L 9/0844 |
| 2018/0278594 A1* | 9/2018 | Schiffman | H04L 9/0861 |
| 2019/0394200 A1* | 12/2019 | Godier | H04L 67/10 |
| 2020/0100105 A1* | 3/2020 | Wang | H04W 12/086 |
| 2020/0134212 A1* | 4/2020 | Hutchison | H04L 9/0833 |
| 2020/0250111 A1* | 8/2020 | Lambrache | G06F 13/1668 |
| 2021/0019061 A1* | 1/2021 | Hiltgen | G06F 21/35 |
| 2021/0243035 A1* | 8/2021 | Ruane | H04L 9/0897 |
| 2021/0374718 A1* | 12/2021 | Fukuhara | G06F 21/34 |
| 2022/0038267 A1* | 2/2022 | Dugardin | H04L 9/321 |

OTHER PUBLICATIONS

Excepts from Gail Grant: Understanding Digital Signatures, McGraw-Hill, 1998, 8 pages (Year: 1998).*

German Patent Office, Office Action issued for DE 102020202532.0, 12 pgs., dated Oct. 9, 2020.

Hamilton, E., et al., "Clarifying Obfuscation: Improving the Security of White-Box DES", Proceedings of the International Conference on Information Technology: Coding and Computing, ITCC 2005.

* cited by examiner

700

Configure the plurality of devices so that each of the plurality of devices has a data packet and an associated key, and is configured to perform an authentication of a communication partner with transmission of the data packet to the communication partner, and with checking of authentication information received from the communication partner for correspondence with the data packet using the key so that different data packets and keys are stored in the plurality of devices on a device-specific or group-specific basis ~710

Fig. 7

DEVICES AND METHODS FOR AUTHENTICATION

CROSS-REFERENCE TO RELATED APPLICATIONS

The present application claims the benefit of the filing date of German patent application no. DE 102020202532.0, filed on Feb. 27, 2020, the contents of which are incorporated herein by reference in their entirety.

TECHNICAL FIELD

The present disclosure relates to devices for mutual authentication of the type that is usable, for example, in the consumables sector. Example embodiments further relate to a concept for key diversification for a secure authentication.

BACKGROUND

Counterfeits are a major issue in end consumer markets with consumables. A high risk exists of counterfeiting companies creating clones of devices, in particular authentication chips, which behave in exactly the same way as an original device. In systems of this type, it may be possible that the acquisition of a secret key (by whatever means) enables the manufacture of clones which operate on a plurality of consuming devices. Blacklisting (exclusion of specific devices) is not always possible here. If clones appear on the market, there are only limited possibilities for identifying them and preventing their use, since they behave in the same way as the original device.

Methods are accordingly desirable which hinder the cloning of consumables.

SUMMARY

The embodiments described herein are directed to a consumer device comprising a sensor According to one example embodiment, a device has a receive device, a data processing device, a transmit device, and an authentication device. The receive device is designed to receive a data packet from a communication partner. The data processing device is configured to process the data packet in order to obtain a secret value. The transmit device is designed to transmit a transmit message comprising information based on the secret value to the communication partner. The authentication device is designed to receive a challenge message and to use the secret value to create a response message. The transmit device is designed to create the transmit message in such a way that it comprises the response message.

According to a further example embodiment, a device which is designed to authenticate a communication partner comprises a data memory, a data interface, a control device and an authentication device. The data memory is designed to store a data packet and a key. The data interface is configured to exchange messages with a communication partner. The control device is designed to read the data packet from the data memory and transmit it by means of the data interface to the communication partner. The authentication device is designed to receive a message comprising authentication information from the communication partner by means of the data interface. The authentication device is designed to check the authentication information for correspondence with the data packet using the key in order to obtain an authentication result. The device is designed to perform a further interaction with the communication partner depending on the authentication result.

A further example embodiment relates to a system in each case having at least one of the preceding devices, wherein the devices form mutual communication partners.

Further example embodiments relate to methods for providing corresponding devices and to methods for authentication.

Further advantageous example embodiments are defined in the dependent patent claims.

BRIEF DESCRIPTION OF THE DRAWINGS/FIGURES

Example embodiments are explained below with reference to the attached drawings, wherein:

FIG. 7 shows a schematic flow diagram of a method according to one example embodiment which can be implemented to produce a plurality of devices;

DETAILED DESCRIPTION

Before example embodiments of the present disclosure are explained in detail below with reference to the drawings, it should be noted that identical, functionally similar or similarly acting elements, objects and/or structures are denoted with the same reference numbers in the different figures so that the descriptions of these elements set out in different example embodiments are interchangeable or can be applied to one another.

Example embodiments described below are described in connection with a multiplicity of details. However, example embodiments can also be implemented without these detailed features. To provide a clearer understanding, example embodiments are further described using block diagrams as a substitute for a detailed description. Details and/or features of individual example embodiments can simply be combined with one another, unless otherwise explicitly described.

The following example embodiments relate to devices and methods which enable an authentication of one device in relation to another device. The following example embodiments are described by way of example in connection with a consumable which is authenticated by a consuming (or using) device. The consumable can be a device which provides (and, for example, stores) a resource which is consumed when the consuming device (host) is operated. Examples of pairs of a consumable and a consuming device are:

printer cartridge—printer;
battery—electrical device which is powered by the battery;
refill cartridge—e-cigarette;
credit card—prepaid cell phone;
coffee capsule—coffee machine;
water filter cartridge—water filter, etc.

The consumable contains, for example a (physical) material which is consumed, as in the case of a printer cartridge, specific battery types or an e-cigarette refill cartridge or a medicinal substance (e.g. drug) for a medical device in a corresponding container. In a different embodiment, however, the consumable can also contain a non-physical resource which is consumed, such as, for example, a credit, e.g. for a prepaid cell phone.

Figure 1:
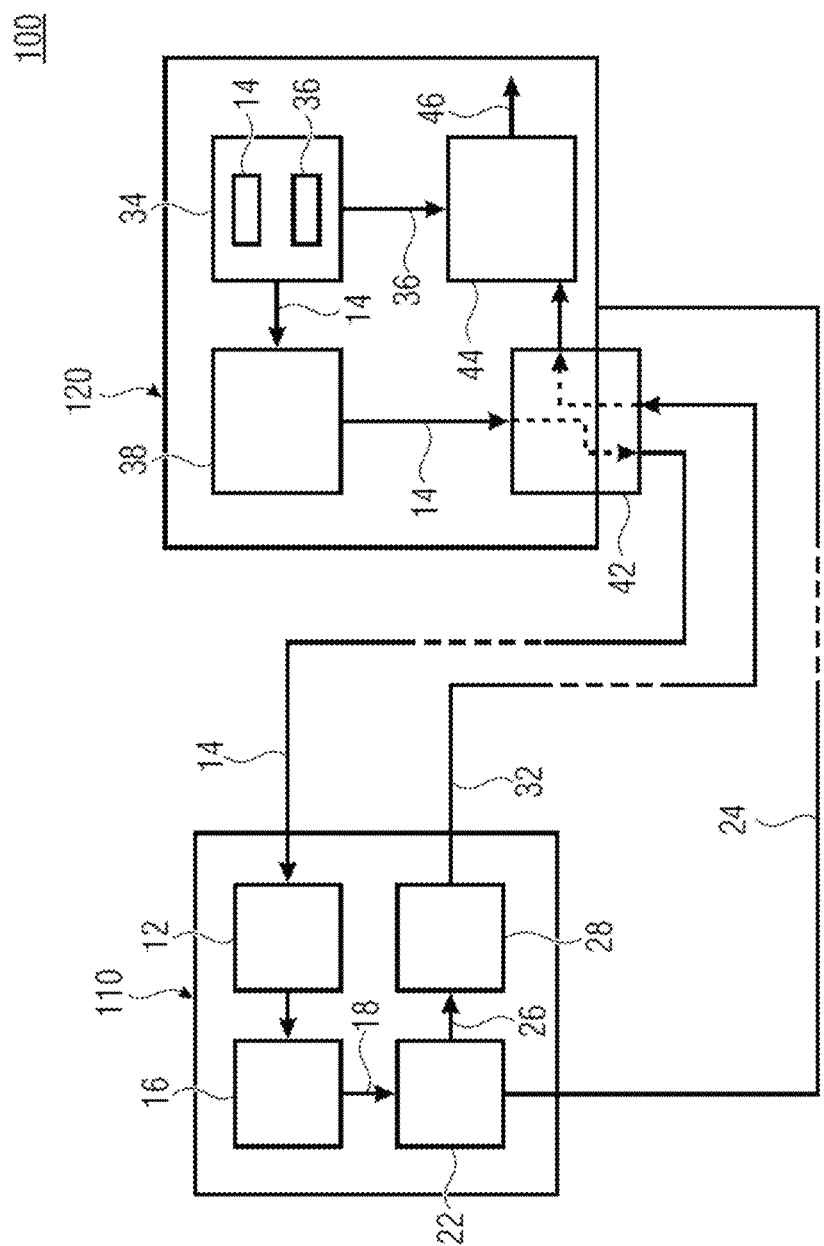
FIG. 1 shows a schematic block diagram of a system according to one example embodiment which represents an example of a consumable arrangement.

In this respect, FIG. 1 shows a schematic block diagram of a system which represents an example of a consumable arrangement 100. The system 100 comprises a device 110 according to one example embodiment. The device 110 can, for example, provide at least a part of the consumable. The system 100 further comprises a device 120 which is configured to communicate with the device 110 so that the devices 110 and 120 form mutual communication partners. The device 120 can provide at least a part of a consuming device. Alternatively or additionally, the device 110, i.e. the consumable or a device connected thereto, can be a communication partner to be authenticated.

The device 110 can, for example, be physically connected to the device 120, e.g. plugged in or built in or otherwise connected, e.g. via a wired or wireless communication connection such as WiFi®, ZigBee® or Bluetooth® or the like. For this purpose, the device 110 can possibly be interchangeably (in particular detachably) connected to the device 120. In the consumables sector, the manufacturer of the consuming device typically wishes that only consumables manufactured by itself (or by a license holder) are used with the consuming device, so that it is desirable for the device 110 to be authenticated by the device 120.

The device 110 comprises a receiving device 12 for this purpose which is configured to receive a data packet 14 from a communication partner. Here, the communication partner is, for example, the device 120. The device 110 further comprises a data processing device 16 which is configured to process the data packet 14 in order to obtain a secret (e.g. predetermined) value 18. This means that a value present in the data packet 14, possibly not in clear text, which represents a secret value can be derived from the data packet 14 by means of the data processing in the data processing device 16. The secret value can also be understood as a secret which can be used, for example, to carry out an encryption method or a signature method.

The device 110 comprises an authentication device 22 which is designed to receive a challenge message 24, for example from the device 120 or from a different authorized device. The challenge message can be referred to as a request or prompt during the answering of which the device 110, in particular the authentication device 22, is requested to provide an answer to the challenge message 24 by providing a response message 26 associated with the challenge message 24. Since the content of the response message 26, i.e. the answer, depends on the content of the challenge message 24, an authentication of the device 110 can thereby be performed. The authentication device 22 is designed to receive the challenge message 24 and to produce the response message 26 using the secret value 18.

The device 110 further comprises a transmitting device 28 which is designed to transmit a transmit message 32 to the device 120. The transmit message 32 comprises the response message 26, so that the transmit message 32 comprises information based on the secret value. It is possible for the transmit message 32 to be produced in such a way that it comprises the secret value 18 itself or any value derived therefrom. The response message 26 can be present in the transmit message 32 similarly in clear text, but can also be encrypted or coded in any way.

The device 120 can be designed to authenticate the device 110. To do this, the device 120 can have a data memory 34 which is designed to store information. At least the data packet 14, for example, and a key 36 are stored in the data memory 34. The key 36 can comprise a bit sequence or a character string or any other value which is to be digitally stored.

The device 120 further comprises a control device 38, which is designed to read the data packet 14 from the data memory 34 and transmit it by means of a data interface 42 to the device 110. The data interface 42 is set up to exchange messages with the device 110 and is configured, for example, to receive the transmit message 32 from the device 110. The challenge message 24 can, for example, also be transmitted with the data interface 42 to the device 110, e.g. whereby the challenge message 24 is provided by an authentication device 44 of the device 120. The authentication device 44 is designed to receive the transmit message 32 from the device 110 by means of the data interface 42. The transmit message 32 has authentication information, in particular the information based on the secret value 18, or the response message 26. The authentication device 44 is designed to check the authentication information for correspondence with the data packet 14 using the key 36 in order to obtain an authentication result 46. The device 120 is designed to perform a further interaction with the device 110 depending on the authentication result 46.

It is thus possible within the system 100 for the device 120 to authenticate the device 110 without having to show knowledge of the secret value 18 in unencrypted form for this purpose. It is thus possible to avoid a tapping of secret values from devices 120, in particular by preventing a secret value thereby tapped from being used to create clones which could also be operated in other devices 120.

Unlike systems in which a consuming device receives a public key (PK) and a certificate from the consumable and checks the authenticity of the public key, wherein the secret is stored in the consumable for this purpose in order to be able to generate a response in the consumable to a challenge created by the host, said response then being verified once more in the host using the public key, example embodiments remove the need to store the secret value 18 in the device 110 also. Since the secret value 18 is derived from the received data packet 14, the response message 26 can be derived directly from the received data packet 14, thus offering a wide range of possibilities. On the one hand, the need to store the secret value 18 in the device 110 can be eliminated, thereby significantly reducing the times at which an attacker could access the secret value 18. In addition, it is possible to design the secret value 18 in a device-specific manner in relation to the device 120 or in a group-specific manner for a group of devices 120, whereas it differs therefrom for other devices or groups. As a result, a secret value 14 which is nevertheless intercepted by an attacker is valid only for the individual device 120 or the group of devices. However, it is difficult for the manufacturer of a clone to assess during manufacture in which subsequent device this clone is intended to be used. This hampers the usability of the clone.

In other words, the example embodiments create a system in which a host checks the authenticity of a device in order to prevent the counterfeiting of consumables (e.g. printer cartridges). Some example embodiments can forego a non-volatile memory (NVM) in the device while nevertheless retaining an adequate level of security. Moreover, the system can used for delayed feature activation and for increasing the level of security of an authentication device at low cost. Example embodiments thus enable the manufacture of cost-effective authentication devices.

Figure 2:
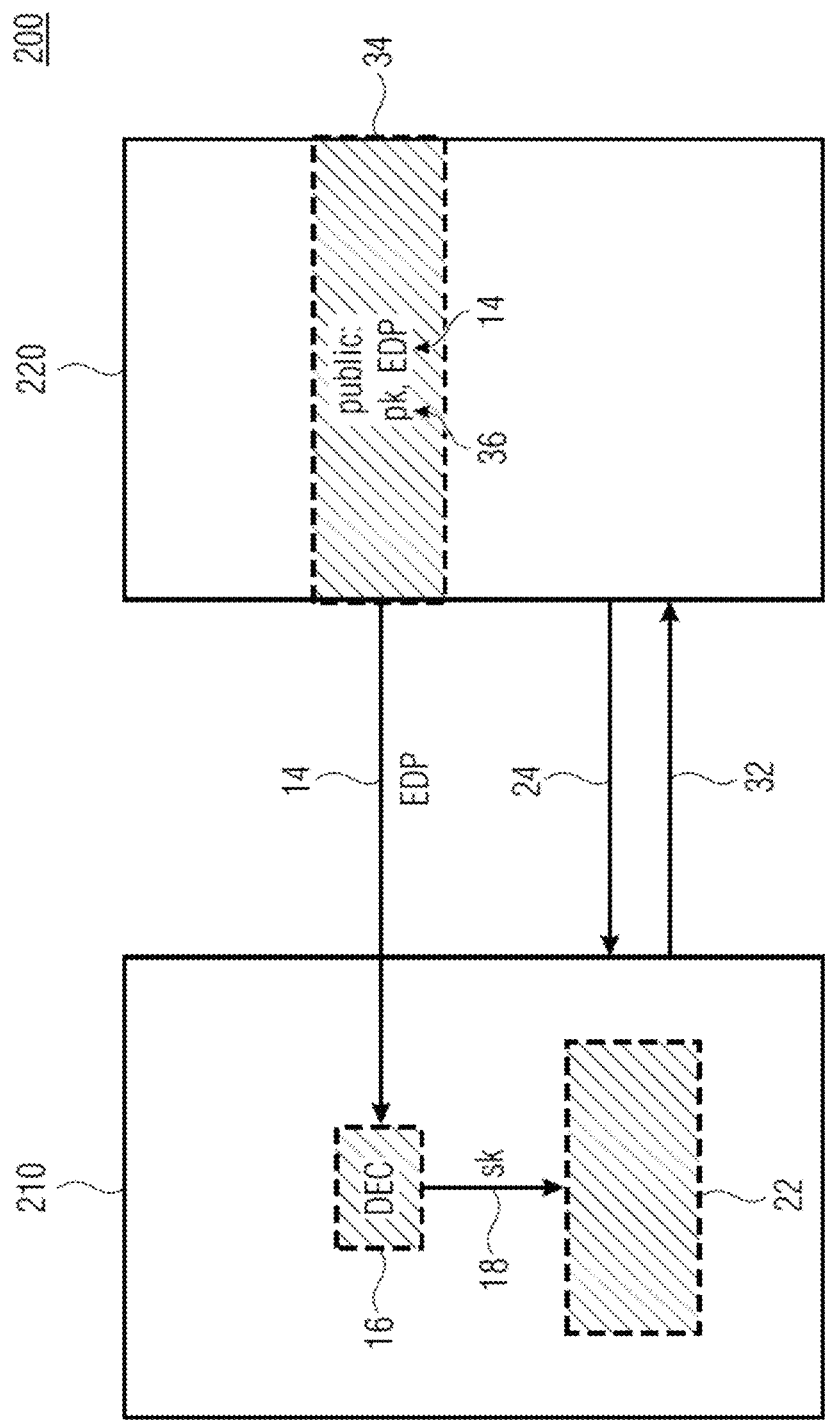
FIG. 2 shows a schematic block diagram of a system according to one example embodiment having an authenticating device and a device to be authenticated.

FIG. 2 shows a schematic block diagram of a system 200 according to one example embodiment in which the communication partners are implemented by a device 210 formed in accordance with the device 120 and a device 220 which is formed in accordance with the details described for the device 120. The device 210 is, for example, a printer cartridge, whereas the device 220 is, for example, a printer, so that the system 200 provides a consumable arrangement with a consumable and a consuming device. For the sake of improved clarity, not all of the elements thereof which are explained in FIG. 1 are also shown in FIG. 2.

The key 36, for example, and the data packet 14 are stored in the data memory 34. According to one example embodiment, the data packet 14 is an encrypted data packet (EDP), although this is not absolutely essential. For this purpose, the data processing device 16 can be configured for decrypting the encrypted data packet 14, i.e. for decoding (DEC). The secret value 18 can thus be a secret key (sk) which is associated with the public key (pk). The authentication device 22 can be designed to generate the response message in answer to the challenge message 24 and using the secret key sk, and to transmit the response message to the device 220 in order to have the authenticity of the device 210 checked, i.e. to enable an authentication. The transmit message 32 can be used for the transmission, e.g. by embedding information indicating the response message.

The information stored in the data memory 34 of the device 220 can be stored without particular security measures, since the secret value is not derivable from the information 14 and 36 without knowledge of the specific calculation methods, so that a tapping of the information stored in the data memory 34 does not necessarily represent a security risk.

In other words, example embodiments are based on the use of keys which are specific to the host (consuming device) rather than consumable-specific keys. The secret value 18/sk is, for example, stored in encrypted form in a data packet (EDP), wherein EDP is equal to ENC(sk), which means that an encryption of the secret value 18 takes place. The device 110 or 120 can obtain the secret value by decrypting EDP and can then use it for authentication. As a result, the device 110 or 120 does not necessarily need a reprogrammable memory, e.g. an NVM (non-volatile memory). This is understood to mean that the device 110 and/or 120 can have memories which can store information in a non-volatile manner also, but these memories are designed so that they always revert to their delivered condition during an operation following delivery and cannot be permanently reprogrammed. This means that information can be stored temporarily in the memory, but a permanent modification of the memory content is not necessary or possible. Thus, for example, in the event of a restart or temporary removal of energy supply sources, it is always possible to revert to the delivered condition with the associated permanently stored information. This means that the device 110 and/or 210 can be designed to store the secret value 18 exclusively in a volatile data memory. For this purpose, the device can possibly have no non-volatile memory in the sense of writable memory cells. Alternatively, memory cells of the non-volatile memory can be permanently programmed so that they are unmodifiable following manufacture.

Example embodiments further enable the security precautions to be concentrated in the decoding function of the device 110/210, e.g. the data processing device 16, which can be protected through corresponding measures to avoid reverse engineering (reconstruction). The device can be implemented in such a way that a possible attacker cannot recognize the result of the decoding. Physical attacks on the authentication can thus be at least mainly in vain, since an attacker, even if successful, only obtains the key sk (secret 18) of a printer, which does not enable the manufacture of universally usable clones.

The data processing device 16 can be designed to execute an encryption and/or decryption function using a secret key in order to obtain the secret value. An encrypted data packet, for example, can thus be decrypted so that the result of the decryption is again the secret value. Alternatively or additionally, the data processing device 16 can be designed to execute a secret function that is difficult to predict, in order to obtain the secret value 18. A function that is difficult to predict can be understood to mean a function which is unknown according to embodiments and/or which modifies the at least one input value in a non-trivial manner that is, where appropriate, unforeseeable for an attacker. Such functions include, for example, a secret function, such as, for example, a hash function. The data packet 14 can thus provide an initial value or basic value as an input value for a hash function.

Example embodiments further provide that the data processing device is implemented in an obfuscated manner. This means that, if the secret hash function is implemented, the data processing device 16 can be designed to execute said hash function in an obfuscated manner in order to obtain the secret value. In the case of the encryption and/or decryption function, the data processing device 16 can be designed to execute this function using the secret key and in an obfuscated manner in order to obtain the secret value. This is understood to mean that the sequence of steps in the implementation of the function is concealed in such a way that reverse engineering is at least hindered. A concealment of this type can be implemented in both hardware and software.

Example embodiments provide that the secret value 18 comprises an initial value (seed) for generating a private key (sk) of an authentication method. Alternatively or additionally, the secret value 18 can comprise a nonce, i.e. a value which has validity for specific operations and/or for a specific time period. These values can be transmitted in encrypted form, but example embodiments also provide an unencrypted transmission, since a processing (the design of the processing function) of the secret value 18 can similarly be secret so that a tapping of the secret value 18 can be problem-free.

The device 110 and/or 210 can be designed to use the private key to create at least a part of the transmit message, in particular the response message 26. Example embodiments provide a plurality of possible implementations as authentication methods, including an asymmetric encryption method, wherein a public key is associated with a private/secret key, as described, for example, in connection with FIG. 2. Alternatively or additionally, a signature method can also be used to implement the authentication method.

As already indicated above, the key 36 can comprise a public key of an authentication method. This public key can be associated with the secret value 18, for example in that the secret value 18 is a corresponding or associated private key. The host can be designed to check the authentication information, i.e. the content of the response message 26, without knowing the private key of the authentication method. It is thus possible, for example, for the authentication device 44 of the device 120 or 222 to be designed to transmit the challenge message 24 to the device 110/210 using the data interface 42, to receive the transmit message 32 as the response message which is associated with the challenge message 24 and which was generated using a private key of the authentication method, wherein this private key is unknown to the host itself. The private key can be generated using the secret value, which also entails that the private key is the secret value, and in both cases the private key is obtained from the data packet 14 through further processing in the data processing device 16.

In other words, in one example embodiment, the host can be identified by a host ID (HID). The host can be equipped with an encrypted data packet $EDP_{HID}$ during the manufacture or personalization of the host chip or via a software update or via an online interactive channel to a server or via a secure hardware token. The $EDP_{HID}$ is, for example, encrypted with a key k and contains a secret value v, so that the following applies: $EDP_{HID}=Enc_k(v)$. A host is further equipped with a public key pk which corresponds to an $EDP_{HID}$, wherein pk=GEN_$PK_s$(v) here for a key generation function GEN and the value v applies to a suitable cryptographic function s. However, it should be noted that the host itself does not know the value of v, since only pk and $EDP_{HID}$ are stored in the host. In most practical cases, each host has an individual $EDP_{HID}$ and an individual pk, but these values can sometimes also be shared among (groups of) hosts and hosts could have a plurality of pairs of $EDP_{HID}$ and pk.

In order to check the authenticity of a device which, for example, is attached to a consumable, the host uses a suitable interface (e.g. I2C) which enables communication with a host device. The host then transmits the $EDP_{HID}$ to the device. The device uses, for example, a decryption circuit structure $Dec_k$ to which the following applies: $v=Dec_k(Enc_k(v))$, and can thus obtain the value $v=Dec_k(EDP_{HID})$ using the key k. The device further implements the GEN_$SK_s$(v) function in order to obtain a secret key sk=GEN_$SK_s$(v). GEN_$SK_s$ is the complementary function to GEN_$PK_s$ and enables the calculation of a secret key (SK) for which a public key (PK) can be generated using a suitable method for a public key identification or digital signature scheme s. The following, for example, is assumed here: s=ECDSA-NIST-P256-SHA256 (elliptical curve digital signature algorithm (ECDSA) of the National Institute of Standards and Technology (NIST), standardized prime curve secp256r1 using a secure hash algorithm (SHA) 2 with 256-bit output, as described in FIPS 186-4—Digital Signature Standard (DSS). For this case, sk=GEN_$SK_s$(v) could simply output v and treat this as a secret scalar and thus as a secret key. This is advantageous, since the GEN_$SK_s$(v) function is implemented on the device and is intended to be optimized in terms of performance and circuit size. GEN_$PK_s$ can perform the key generation of the ECDSA algorithm using sk=$d_A$ as a secret key in order to calculate $Q_A=d_A \times G$. It should be noted that GEN_$PK_s$ is not executed on the device or the host, and only the result pk is stored in a host.

After the device has processed the $EDP_{HID}$, the host generates a challenge using the c=$CHALL_s$ function for the scheme s. For s=ECDSA-NIST-P256-SHA256, this challenge c is merely a randomly selected number having a length from e.g. 128 to 256 bits. This challenge is transmitted to the device which executes an r=$AUTH_s$(c, sk) function which uses the challenge c and the secret key sk as input and then returns a response r. For s=ECDSA-NIST-P256-SHA256, this is the ECDSA signature generation function and the response is a signature for the random value c which is provided by the host. The response r is then transmitted to the host and the host then executes the $VER_s$(r, pk) function in order to check whether the response is valid. A response can be checked with the public key pk and is valid if the device has demonstrated knowledge of the secret key sk (without revealing sk). In the case of s=ECDSA-NIST-P256-SHA256, the $VER_s$ function performs the signature verification and checks that the signature r can be verified via the challenge c with the public key pk. If the verification is successful, the device is regarded as authentic, and if the verification fails, the device is treated as not authentic. The host could then stop the use of a consumable or could stop its function, since a non-authentic and therefore probably dangerous component has been introduced into the system.

Figure 3:
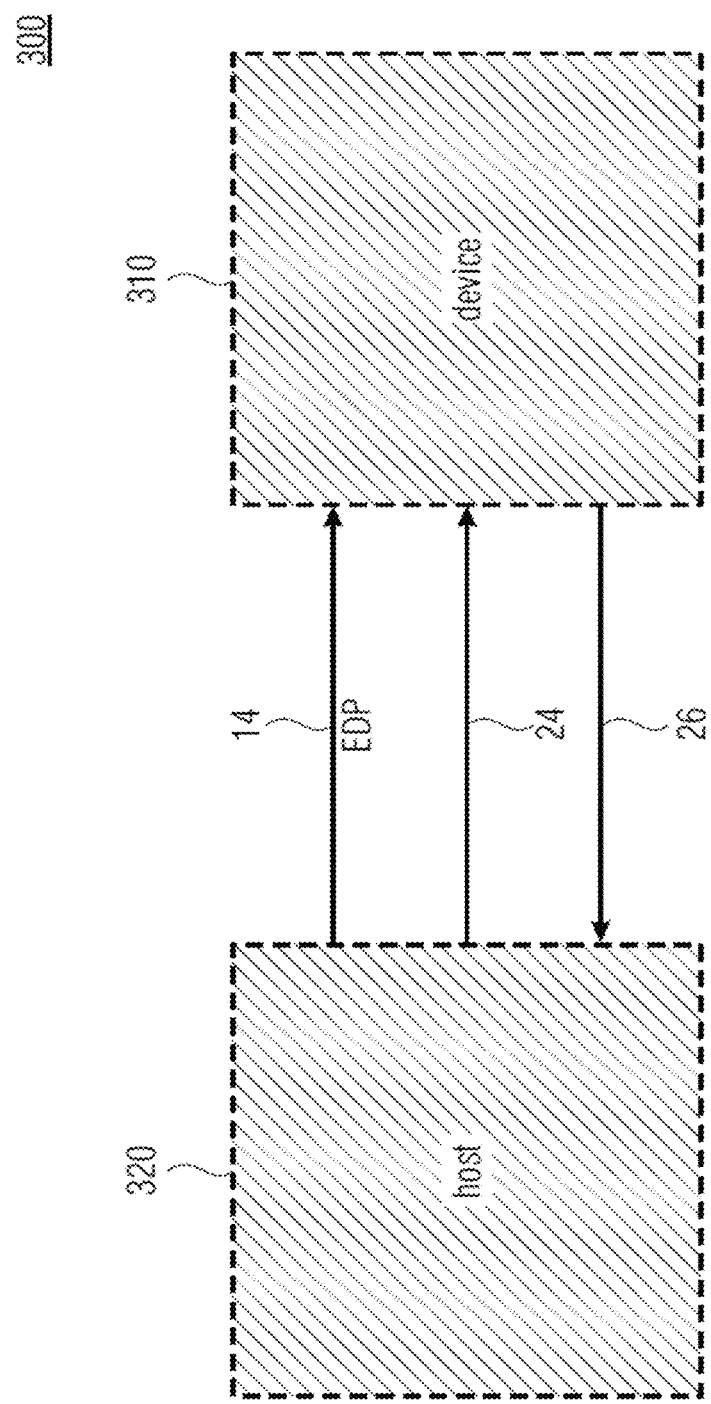
FIG. 3 shows a schematic block diagram of a system according to one example embodiment, and a message flow for transmitting a data packet, a challenge message and a response message for authentication.

FIG. 3 shows a schematic block diagram of a system 300 according to one example embodiment in which a message flow can be executed in order to transmit the data packet 14, the challenge message 24 and the response message 26 for authentication between a device 310 (device) and a device 320 (host). The device 310 can be designed in accordance with the device 110 and/or 210, while the device 320 can be designed in accordance with the device 120 and/or 220.

Figure 4:
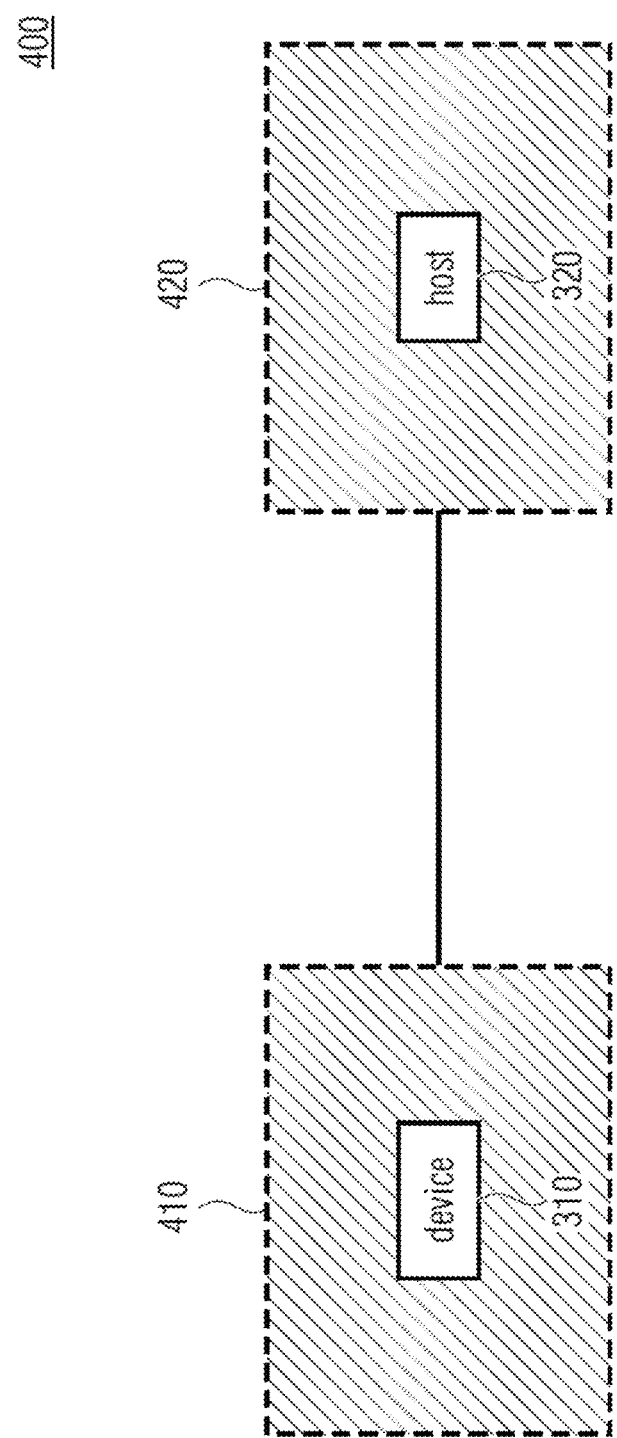
FIG. 4 shows a schematic block diagram of a system according to one example embodiment which has a consumable and a consuming device.

FIG. 4 shows a schematic block diagram of a system 400 according to one example embodiment which has, for example, a consumable 410 and a consuming device 420. The consumable 410 can, for example, be coupled with the device 310, while the device 320 can be coupled with the consuming device 420 or can form a part thereof, so that the resource stored by the consumable 410 and its consumption can be authenticated by the device 420. The system 400 can thus be any consumable arrangement, for example as a battery 410 which supplies an electrical consumer 420, for example in automobiles, with electric current.

In other words, systems described herein can be used for device authentication and can provide the unique feature that a device does not require an NVM in order to achieve key diversification. A private key, for example, is stored in a protected manner in a device in an NVM and the host can access a public key and a certificate in order to execute an authentication protocol on a challenge and response basis. An NVM could mean prohibitively high additional costs for a device. On the other hand, it is desirable to use different keys for the public key authentication mechanism in order to prevent an attacker from building clones using extracted secret keys. Furthermore, no security control is required on the host side, since the host does not process any secrets. This would be the case if a symmetric challenge-response scheme were used for the authentication, see e.g. FIG. 2.

This problem can be overcome with the basic idea of storing a host-specific public key (pk) and the host-specific encrypted secret key $EDP_{HID}$ in the host. Assuming that an attacker is not able to penetrate the $Dec_k$ functionality, it is not economically viable to produce cloned devices. In this sense, penetration means reverse engineering of the algorithm Dec and extraction of the secret key k (it should be noted that the algorithm and the key can be amalgamated into one circuit block). $Dec_k$ can be protected as follows:

Countermeasures are therefore devised against the cloning of the $DEC_k$ circuit, for example measures which increase the risk that, in the event of a counterfeiting of the circuit, the counterfeit (cloned) circuit will be defective, i.e. clone errors will occur.

For this purpose, techniques can be employed which make the cloning of digital implementations as error-prone as possible. Techniques provide the integration of circuit blocks which could be cloned theoretically or only with substantial effort. One example relates to special cells with particular characteristics for hindering analysis or physical unclonable functions (PUFs).

The $Dec_k$ circuit can also be implemented using standardized block ciphers, such as Advanced Encryption Standard (AES) or Data Encryption Standard (DES), or variants of such algorithms (different s-boxes, number of rounds, different constants). It could further use stream ciphers, such as e.g. Trivium, or sponge-based constructs, such as SHA3/Keyak, or variants of such algorithms. A device could also implement variants or different instantiations of $Dec_k$ (e.g. for different market segments).

Even if an attacker obtains a value v or a secret key sk and produces a clone with these values, this clone will operate only with one specific host. The reason for this is that each host accepts only one host-specific public key. A cloned device clone would not operate with a different host, since the host is in possession of a different EDP and pk. The attacker is not able to manufacture universally operating clones without complete extraction/reverse engineering of the $Dec_k$ circuit structure. It should be noted that the description of the circuit of $Dec_k$ and $Enc_k$ is not present on the host. The host is equipped only with an $EDP_{HID}$, but the encryption is performed in a protected environment. It is consequently possible to save effort on the physical protection of $sk=GEN\_SK_s(v)$ and $AUTH_s(c, sk)$. If the effort made to obtain these values is great enough (e.g. an unpacking of the device is required), only a small fraction of owners of the host will purchase cloned devices and provide such clones themselves. Counterfeit goods will furthermore always be identified and the owner of the host will notice that the device is not authentic.

Figure 5:
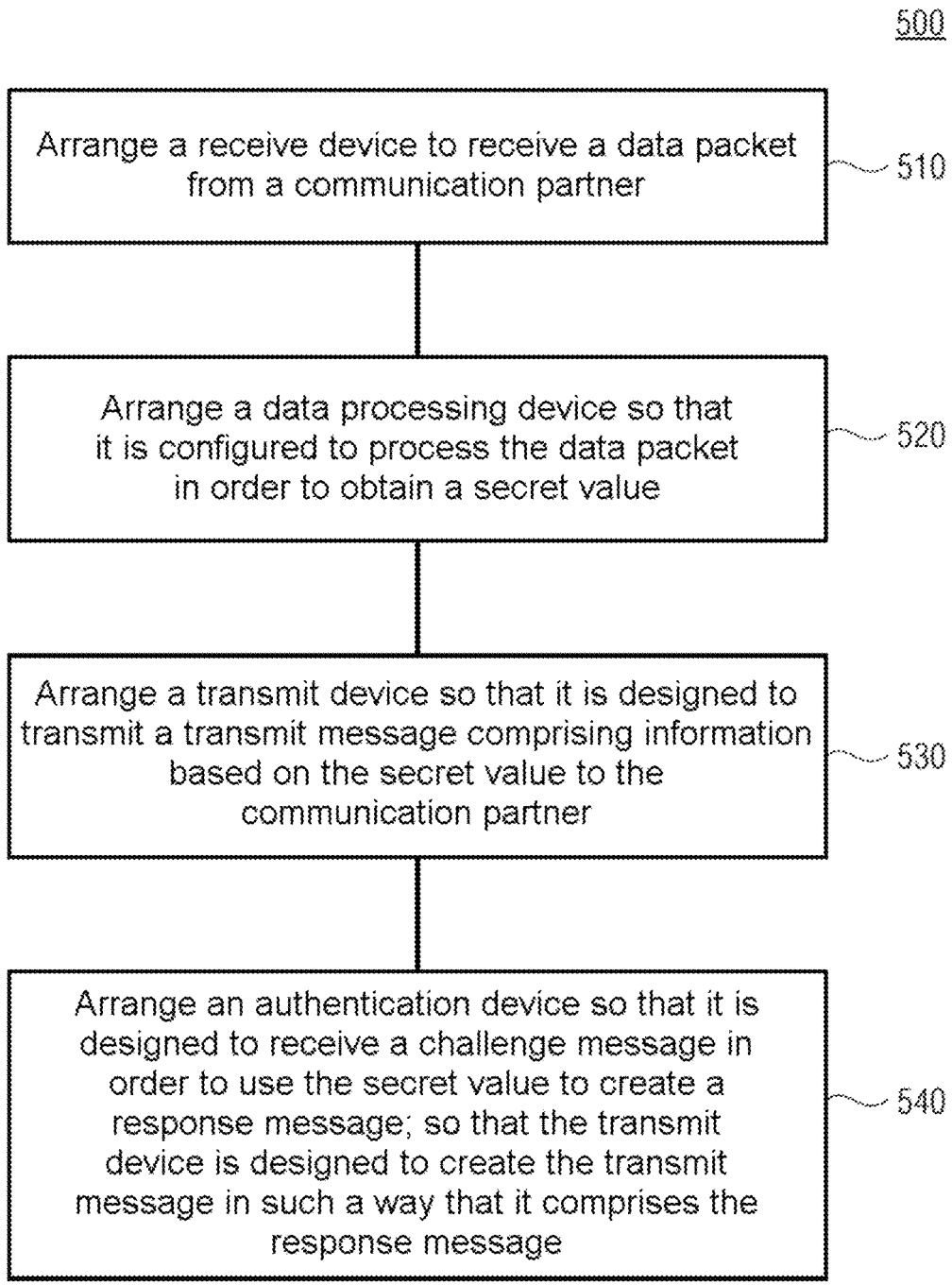
FIG. 5 shows a schematic flow diagram of a method for providing a device which is to be authenticated in accordance with an embodiment.

FIG. 5 shows a schematic flow diagram of a method for providing a device, e.g. the device 110, 210 or 310. A step 510 comprises arranging a receive device to receive a data packet from a communication partner. A step 520 comprises arranging a data processing device so that it is configured to process the data packet in order to obtain a secret value. A step 530 comprises arranging a transmit device so that it is designed to transmit a transmit message comprising information based on the secret value to the communication partner. A step 540 comprises arranging an authentication device so that it is designed to receive a challenge message in order to use the secret value to create a response message so that the transmit device is designed to create the transmit message in such a way that it comprises the response message.

Figure 6:
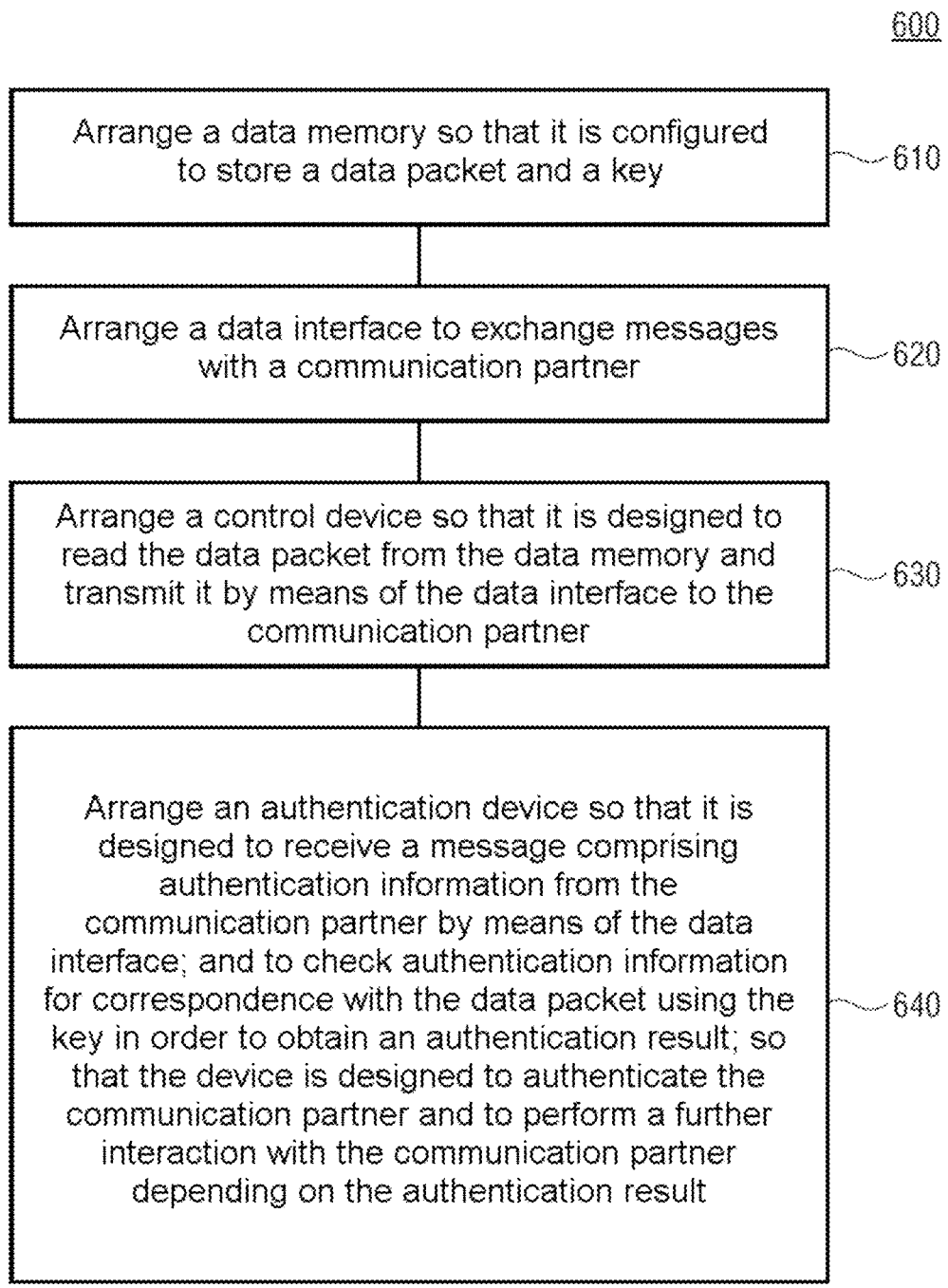
FIG. 6 shows a schematic flow diagram of a method for providing an authenticating device in accordance with an embodiment.

FIG. 6 shows a schematic flow diagram of a method 600 for providing a device, e.g. the device 120, 220 or 320. A step 610 comprises arranging a data memory so that it is configured to store a data packet and a key. A step 620 comprises arranging a data interface to exchange messages with a communication partner. A step 630 comprises arranging a control device so that it is designed to read the data packet from the data memory and transmit it by means of the data interface to the communication partner. A step 640 comprises arranging an authentication device so that it is designed to receive a message comprising authentication information from the communication partner by means of the data interface. The step is further carried out in such a way that the authentication device is designed to check the validity of the authentication information with reference to the data packet using the key in order to obtain an authentication result so that the device is designed to authenticate the communication partner and to perform a further interaction with the communication partner depending on the authentication result.

The method 600 can be carried out multiple times in order to provide a plurality of devices. A method carried out multiple times in this way can further be designed so that a device-specific or group-specific storage of a data packet associated with the group or device and a key associated with the data packet takes place. The key can, for example, be associated with the data packet insofar as a further key associated with the key is also generated for the data packet. It can thus be configured that the data packets and the associated key differ between devices or groups so that, even if a clone is successfully created, the usability of said clone will be hindered.

FIG. 7 shows a schematic flow diagram of a method 700 which can be implemented to produce a plurality of devices. In a step 710, the plurality of devices are configured so that each of the plurality of devices has a data packet and an associated key, and is configured to perform an authentication of a communication partner with transmission of the data packet to the communication partner, and possibly a challenge message also, and with checking of authentication information received from the communication partner for correspondence with the data packet using the key. The method is carried out in such a way that different data packets and keys are stored in the plurality of devices on a device-specific or group-specific basis.

The method 700 can be carried out in such a way that an unauthorized tapping of a secret value contained in the data packet or a secret value derived from the data packet and a transfer of the secret value onto a clone of the communication partner results in a positive authentication result at most for the device or the corresponding group of devices if the clone is used. In order to achieve this, the challenge message refers to the secret value so that other devices or groups transmit a different authentication message and therefore expect the use of a different secret value, which cannot be accomplished by the tapped secret value.

Figure 8:
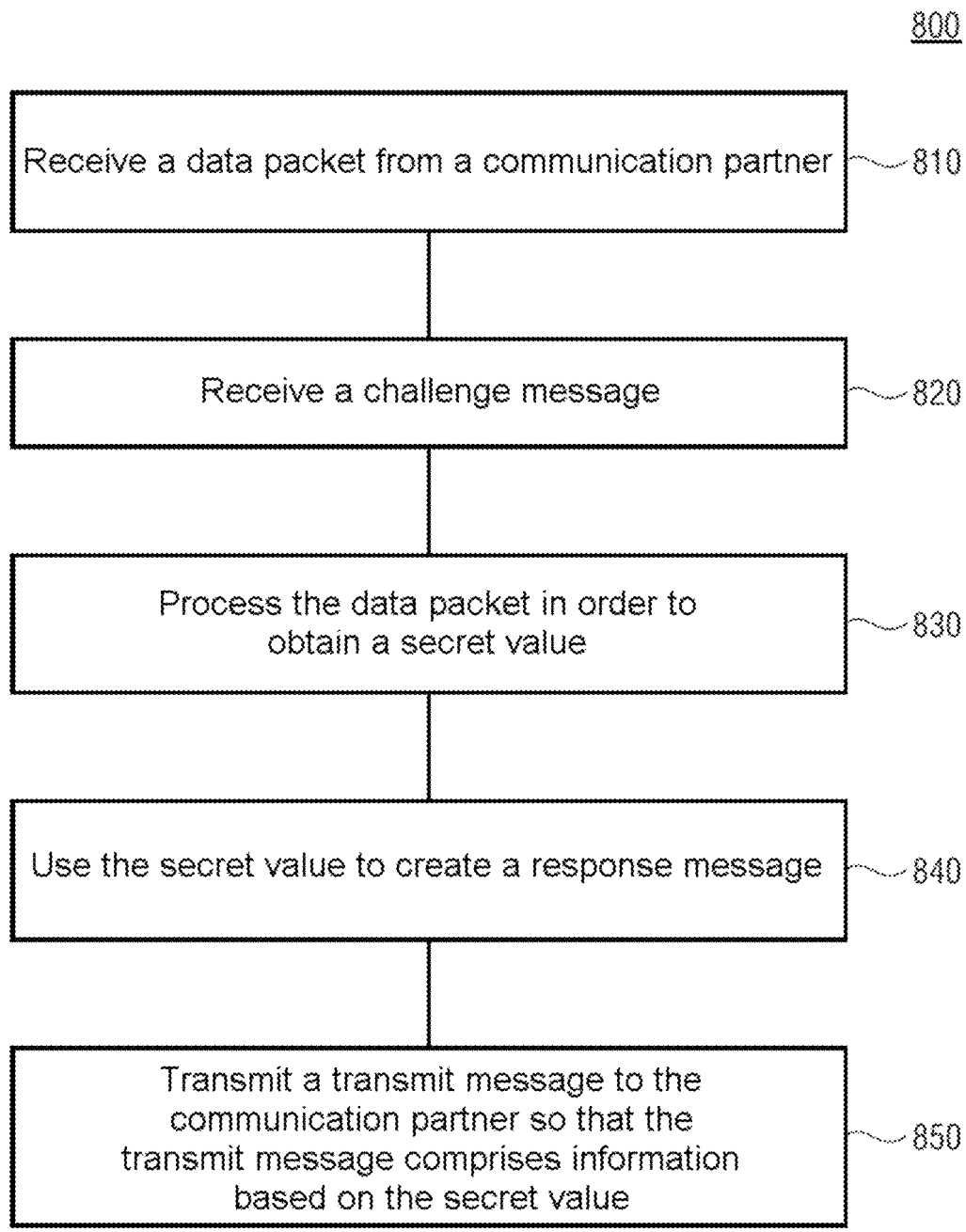
FIG. 8 shows a schematic flow diagram of a method according to one example embodiment which can be implemented, for example, by the device from FIG. 5.

FIG. 8 shows a schematic flow diagram of a method 800 according to one example embodiment which can be carried out, for example, by a device described herein, e.g. the device 110, 210 or 310, but can also be implemented independently from these devices. A step 810 comprises receiving a data packet from a communication partner. A step 820 comprises receiving a challenge message. A step 830 comprises processing the data packet in order to obtain a secret value. A step 840 comprises using the secret value to create a response message which can represent an answer to the challenge message. A step 850 comprises transmitting a transmit message to the communication partner so that the transmit message comprises information based on the secret value.

Figure 9:
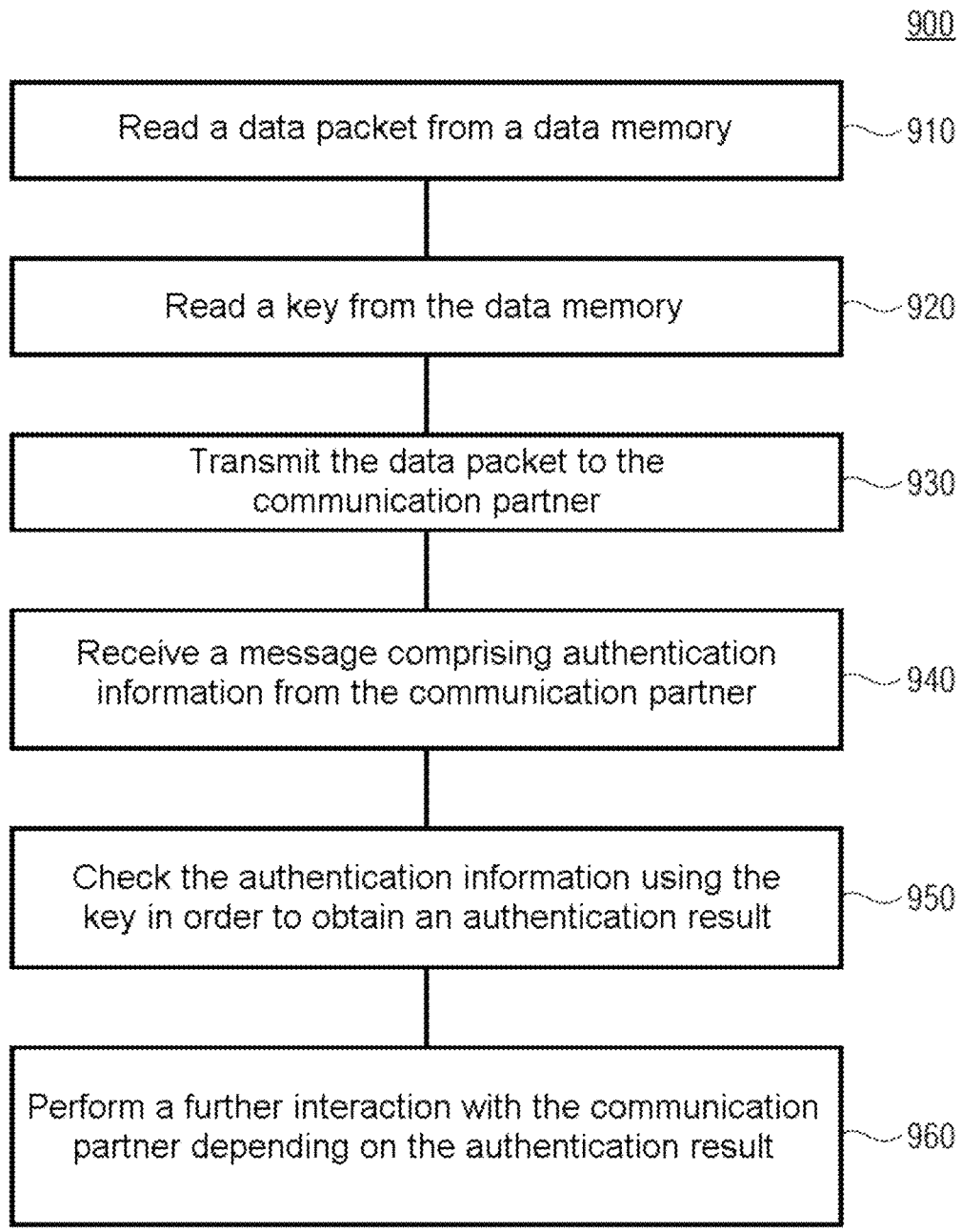
FIG. 9 shows a schematic flow diagram of a method according to one example embodiment which can be used to authenticate a communication partner.

FIG. 9 shows a schematic flow diagram of a method 900 according to one example embodiment which can be applied to authenticate a communication partner and can be implemented, for example, by the device 120, 220 or 320, but also independently therefrom. A step 910 comprises reading a data packet from a data memory. A step 920 comprises reading a key from the data memory. A step 930 comprises transmitting the data packet to the communication partner. A step 940 comprises receiving a message from the communication partner, wherein the message comprises authentication information. A step 950 comprises checking the authentication information using the key in order to obtain an authentication result. A step 960 comprises performing a further interaction with the communication partner depending on the authentication result.

Figure 10:
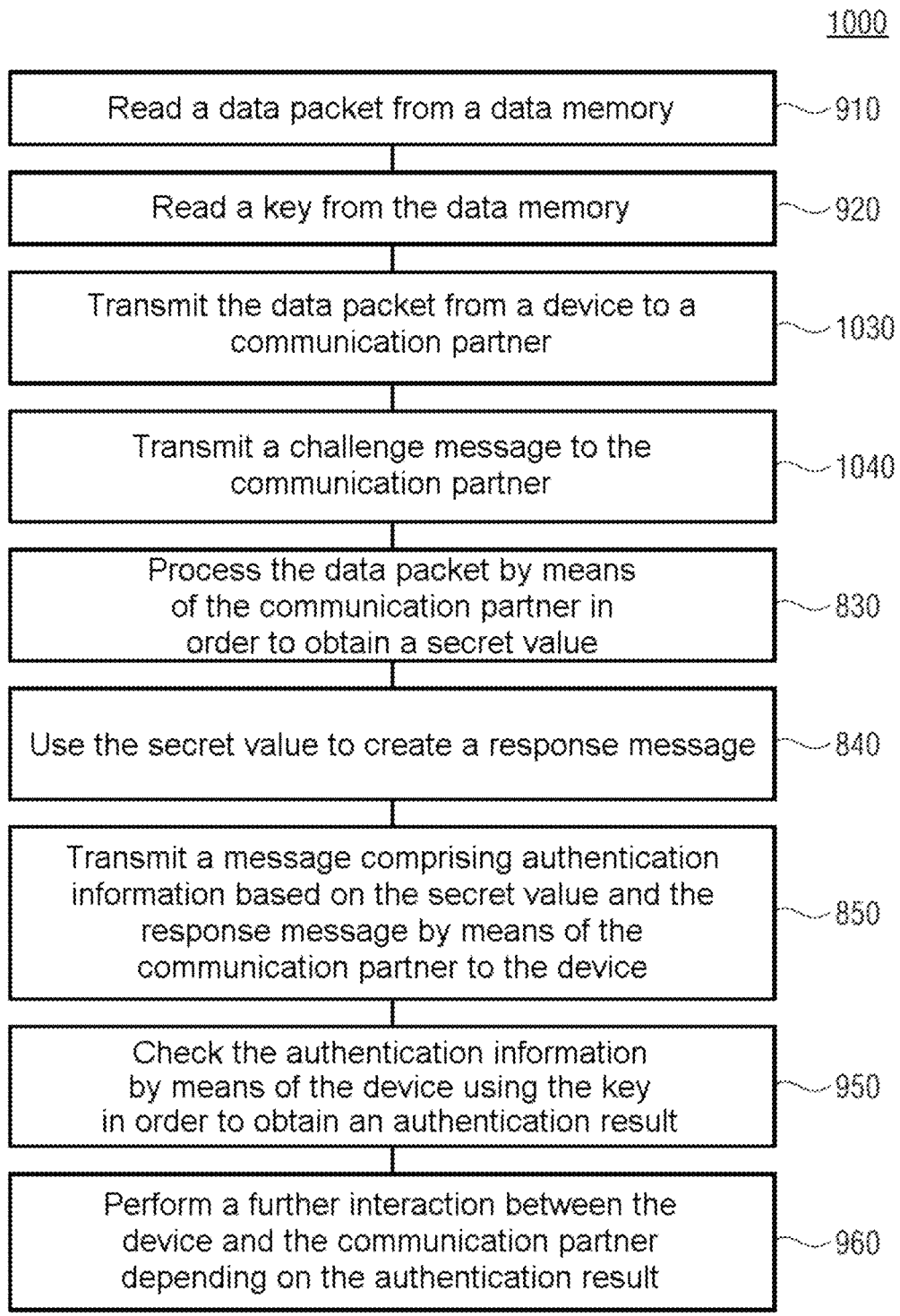
FIG. 10 shows a schematic flow diagram of a method according to one example embodiment which combines steps of the methods from FIG. 8 and FIG. 9.

FIG. 10 shows a schematic flow diagram of a method 1000 according to one example embodiment. The method 1000 can comprise the steps 910 and 920. In a step 1030, the data packet read in step 910 can further be transmitted from a device to a communication partner, e.g. to the device to be authenticated. This data packet can, for example, be received from the device in step 810. A step 1040 comprises transmitting a challenge message to the communication partner which can be received, for example, in step 820.

The method further comprises steps 830, 840 and 850 in which the received information is processed in order to obtain the secret value, to create the response message therefrom and to create the transmit message which comprises the authentication information based on the secret value. The method 1000 further comprises steps 950 and 960 in which the authentication information is checked and the further interaction is performed depending on the authentication result.

It should be noted that, in the methods described above, a sequence of the steps can differ from the sequences shown in the figures. Thus, for example, the implementation of a time or a sequence of the reading of information may differ from that shown. Individual calculation steps can also be performed in a different sequence.

Figure 11:
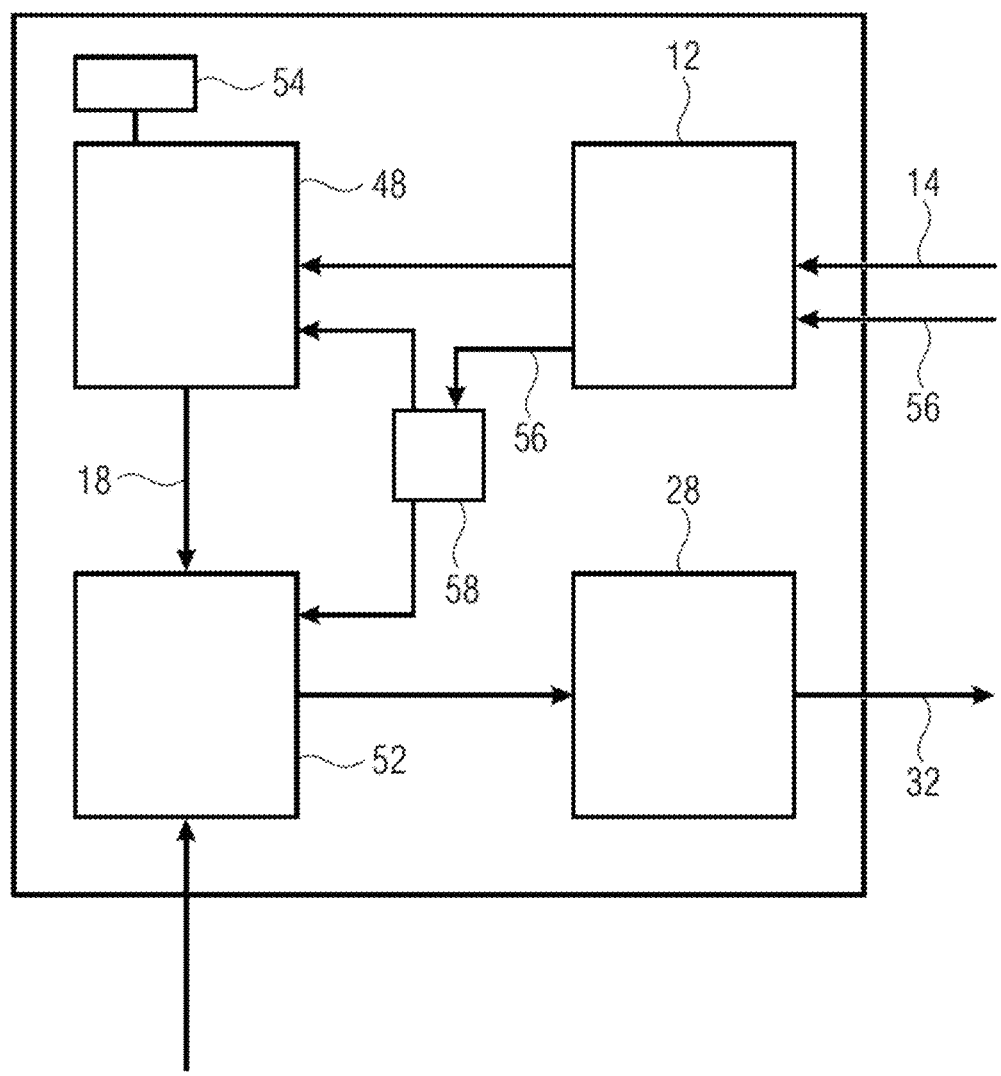
FIG. 11 shows a schematic block diagram of a device according to one example embodiment.

Example embodiments described above are based at least partially on the notion that the production of clones is hindered by first generating the secret value in the device which is to be authenticated. Further example embodiments relate to the provision of functions in the device which pose or increase the risk that a clone will not be operated or will only be operated defectively in a subsequent device. This can include, for example, physical countermeasures, wherein the example embodiments provide, in particular, the implementation of hidden functions which are activated at a later time. According to one example embodiment, it is provided that methods or processes for obtaining secret values and/or for authentication are modified in ongoing operation. Example embodiments thus provide devices which are designed to receive a selection message. This involves, for example, developments of the device 110, 210, 310 or 410. A device of this type can have a data memory which is designed to provide a key for the data processing device 16. The device can be designed to modify the key in response to the selection message. A device of this type is shown by way of example in FIG. 11 as a schematic block diagram. The device 1100 shown there can comprise the receive device 12 and the transmit device 28 described in FIG. 1. The device 1100 has a data processing device 48 which is modified compared with the data processing device 16, and/or an authentication device 52 which is modified compared with the authentication device 22. The data processing device 16 can optionally be arranged instead of the data processing device 48, or the authentication device 22 can be arranged instead of the authentication device 52. The device 1100 can optionally have a data memory 450 which is designed to store one or more keys, i.e. bit sequences. These keys can be used by the data processing device 48 or 16 in order to obtain the secret value.

The device 1100 can be designed to receive the selection message 56, for example by means of the receive device 12. In response to the selection message, the device can be designed to use a different key from the data memory 54 in order to provide it to the data processing device 48 or 16. This means that the key can be modified to receive the secret value 18 in response to the selection message 56. This enables the subsequent modification of the structure of the data packet 14 in ongoing operation also. A configuration of the host (device 120, 220 or 320), for example, can thus be modified in ongoing operation.

The use of clones, even with corrupted or stolen keys, can thus be hindered.

Alternatively or additionally, it is provided in example embodiments that the data processing device 48 has one or more processing logic circuits which are configured to provide or implement a plurality of variants of a logic function for processing the data packet. The device 1100 can have a selection device 58 which is configured to end the use of a first variant of the logic function for processing in the data processing device 48 and to begin the use of a second variant of the logic function for processing the data packet 14 in response to the reception of the selection message 56. Alternatively or additionally, the authentication device 52 can have one or more authentication logic circuits which are configured to implement a plurality of variants of a logic function for authenticating the device. The selection device 58 can be designed to end the use of a first variant of the logic function for authentication and to begin the use of a second variant of the logic function for a authentication in response to the reception of the selection message 56.

In other words, the manner in which the data packet 14 is evaluated or processed can be modified and/or the manner in which the response message is generated can be modified in response to the selection message 56, thus offering a high level of security.

The selection device 58 can be designed to receive and evaluate the selection message 56. The selection device 58 can be designed to verify the selection message 56, which means ensuring that it originates from a trusted source. The selection device 58 can be designed to end the first variant of the logic function in the data processing device 48 and/or the authentication device 52 and to replace it with a different variant, i.e. to begin said variant, only if the verification is successful. Different options are available for the verification. An encryption, decryption or signature, for example, can thus be used. Example embodiments provide that the selection device 58 is designed to determine a hash value based on the selection message 56 using a hash function, and to classify the verification as successful if the hash value corresponds to a predetermined hash value. This is equivalent to classifying the verification as unsuccessful if the hash value does not correspond to the predetermined value. Alternatively or additionally, the hash value can also be checked for correspondence within a tolerance range, i.e.

whether the hash value lies within a predetermined value range, in each case with and/or without the value range limits.

The selection message 56 can be transmitted, for example, from a correspondingly configured device 120, 220 or 320. This device can be designed to transmit the selection message 56 to the communication partner, i.e. the consumption device, such that said message contains an instruction to modify a key for processing the data packet in response to the selection message 56. Alternatively or additionally, the selection message 56 can contain an instruction to end the use of a first variant of a logic function for processing the data packet and to begin the use of a second variant of the logic function for processing the data packet in response to the reception of the selection message 56. Alternatively or additionally, the selection message 56 can contain an instruction to end the use of a first variant of a logic function for authentication and to begin the use of a second variant of the logic function for authentication in response to the reception of the selection message 56.

Any number of logic functions can be provided in the data processing device 48 and/or the authentication device 52, for example at least two, at least three, at least five, at least ten or any other number.

The logic function variants, i.e. the individual circuits or the sub-circuits implementing the logic function variants, and also the selection device 58 can be protected against reverse engineering by means of a suitable countermeasure. An example of a countermeasure of this type is a contact hole camouflage in which contact holes are provided between different layers of a chip which do not however establish contact between the layers and therefore mislead a counterfeiter in respect of connections present in the respective sub-circuit. The logic functions can, for example, be cryptographic logic functions, but can generally implement any digital function which manipulates data. The risk of clone errors can be increased by means of a cryptographic logic function, since such a function typically has the characteristic that it is highly probable that the modification of an input bit will result in the modification of many output bits of the logic function. Alternatively or additionally, obfuscation measures can be used, for example with contact hole camouflage in other device parts also, e.g. the data processing device 16 or parts thereof, i.e. such measures are not limited or restricted to the delayed feature activation function.

The selection function 56 can be implemented using a cryptographic hash function or a permutation. The use of a different logic function variant is protected, for example, by an activation mechanism in which the host authentication circuit 44 (for example initiated by a user) feeds an unlocking password or an unlocking code to the consumable authentication circuit 52 which is hashed by the consumable authentication circuit 52 using a hash function and is stored with a reference value (for this logic function which is to be activated) in the consumable authentication circuit 52. The host authentication circuit 44 can generally activate the use of a different logic function variant by providing evidence of knowledge of a secret (such as a password or a release code) to the consumable authentication circuit 52. Only if the generated hash value matches the reference value which is associated with the function variant to be activated, the consumable authentication circuit or the selection device 58 performs the selection of the logic function variant.

In other words, according to example embodiments, authentication systems can also be used in a scenario in which logic is introduced with clone countermeasures which are not active as from the initial market launch. In this case, a logic block is protected against reverse engineering and is not used in the market launch. Since the logic is not used during the initial operation and is also protected against use, the risk of reverse engineering errors is substantially increased. The advantage here is that a reverse engineering company does not possess the means to verify the correctness of extracted logic. At least one additional round of reverse engineering must inevitably take place at a later stage, which means increased cost and effort for the production of device clones.

In one example embodiment of this type, a device can be equipped with a functionality for asymmetric challenge-response authentication which can be the same as in the described system or which can be independent—but uses different pk1/sk1 pairs. This basic authentication system can be used immediately after the market launch.

Figure 12:
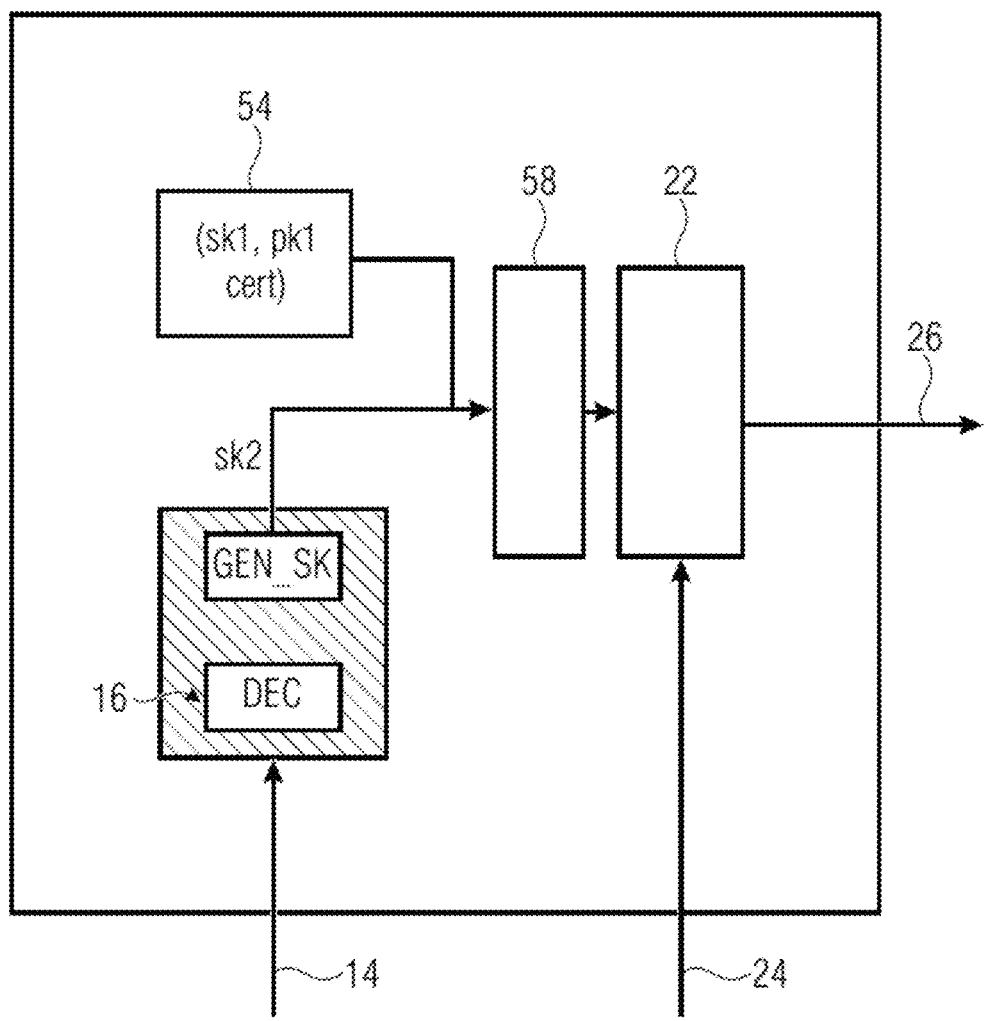
FIG. 12 shows a schematic block diagram of a device according to one example embodiment which has additional protection mechanisms.

For this purpose, FIG. 12, for example, shows a schematic block diagram of a device 1200 according to one example embodiment. Although not all elements are shown, the device 1200 can have a functionality which is explained, for example, in connection with the devices 110, 210 or 310.

The $Dec_k$ block is the aforementioned logic which is first activated in order to hinder reverse engineering. It is configured to reject incorrectly coded $EDP_{HID}$ data, and the host has no access to this information at the market launch. The host cannot therefore use the $Dec_k$ logic block, and reverse engineering is complicated. A specific time after the market launch of the device and host unit, the host then receives the $EDP_{HID}$ and pk2, for example in the form of a selection message 56, for example by means of a software update. Since the host-specific $EDP_{HID}$ data packet is correctly coded, it can be processed by $Dec_k$. The host can then use the authentication with the scheme s and sk2 which is embedded in the $EDP_{HID}$ which corresponds to the pk2. The new key sk2 can be stored in a corresponding memory 58 for this purpose. It should be noted that a shared resource use with the basic authentication system comes into consideration for this functionality. The response message 26 can thus be generated using the key sk1 or the key sk2.

An attacker is then confronted with the problem that a possible clone possesses no functioning block for $Dec_k$, assuming that the attacker was not able to verify the functionality of the circuit and implement it correctly. In this example embodiment, the device either uses a secret key sk1 which is obtained from the NVM (for the basic authentication scheme), or can also use a secret key sk2 which is obtained from an EDP. The underlying algorithm is the same in both cases, e.g. ECDSA. Some components, e.g. comprising $Dec_k$ and $GEN\_SK_s$, can be protected against analysis through reverse engineering.

In an alternative example embodiment, a secret key k' can be used to encrypt each host-specific $EDP_{HID}$. Hosts thus contain only the encrypted $EDP'_{HID}=Enc''_k(EDP_{HID})$ at the market launch. Each host does not necessarily then have to receive a specific $EDP_{HID}$/pk pair for the delayed feature activation, but instead, for example, it can suffice to receive only k' can suffice in order to unlock the existing, host-specific $EDP_{HID}$/pk pairs. Without access to k', it is not technically feasible to obtain the encrypted data, e.g. if a strong encryption, such as AES (Advanced Encryption Standard), is used.

One advantage of the described method is that it belies the assumption concerning key security. In this sense, every device in the prior art possesses a different key and the authenticity of the key is ensured by means of a digital certificate. If a key is lost, it can be copied and used for authentications which are accepted by any host. However, since the keys are now bound to a host, the generation of a functioning clone is not enabled even if an attacker can extract a key $\underline{sk}$ or v from a device. Since other hosts are provided with different EDP/pk pairs, the key is not accepted. In order to enable a cloned device (assuming that $DEC_k$ has not been cloned), a user would first have to extract sk which corresponds to the EDP of the host and transfer it into a clone. Alternatively, the user would have to replace the EDP/pk in a host with the one that was used to program the clone. Both options appear to be economically unviable.

EXAMPLES

Various exemplary embodiments will be specified below.

Example embodiments could consequently also be used as an additional security measure immediately after the market launch in order to deter attacks on the basic authentication (e.g. side-channel attacks or fault attacks). An attacker can no longer succeed by extracting a secret key from the asymmetric authentication system, since the functionality of $Dec_k$ must also be cloned. The attacker cannot anticipate the key that is used by the host system to which the clone will ultimately be applied. These features can further be achieved without cryptography or sophisticated secret key storage in the host. The only condition consists in the provision of hosts (or groups of hosts) with specific $EDP_{HID}$/pk pairs.

For the extended variability of example embodiments, the $Dec_k$ circuit can be designed by means of a ROM mask. Additional data could be present in a ROM mask or through the use of protection mechanisms. This prevents the reuse of a chip for different application scenarios.

A device could be deactivated by the host using an analog feature (e.g. a high current) when the consumable is used up.

Example embodiments enable the use of a public key scheme having a very short key length. Since each host now possesses a specific key, the value of the penetration of the cryptographic mechanism is substantially reduced. Even authentication protocols with elliptic curves having a length of at most 200 bits, at most 150 bits or 100 bits could consequently provide adequate security, since a cryptographic attack enables only a construction of clones which function with a specific host. The long-term secret is the functionality of $DEC_k$. No verification of certificates or transfer of public keys is further required for the techniques in accordance with the embodiments described herein. This can reduce the code footprint of software on the host or on the device.

It is further noted that a value in the NVM could also be used as a secret input in $DEC_k$. This enables the use of one chip for a plurality of customers. This approach prevents a "crossover use". It should furthermore be noted that there is no need for a completely functional encryption/decryption which consists of a procedure for $ENC_k$/$DEC_k$. A secret function $y=f(x)$ is sufficient. The data packet, e.g. EDP, is then x and the value $f(EDP)$ is the secret key sk.

Example embodiments can be used for:
improving the security of products with a basic authentication mechanism,
improving a delayed function activation,
single use for a highly cost-effective authentication for devices without NVM or with only a very restricted non-volatile memory, etc.

Although some aspects have been described in connection with a device, these aspects obviously also represent a description of the corresponding method, so that a block or a component of a device should also be understood as a corresponding method step or as a feature of a method step. Similarly, aspects that have been described in connection with or as a method step also represent a description of a corresponding block or detail or feature of a corresponding device.

Depending on specific implementation requirements, example embodiments of the disclosure can be implemented in hardware or in software. The implementation can be carried out using a digital storage medium, for example a floppy disk, a DVD, a Blu-ray disc, a CD, a ROM, a PROM, an EPROM, an EEPROM or a FLASH memory, a hard disk or a different magnetic or optical storage device on which electronically readable control signals are stored which can interact or interact with a programmable computer system in such a way that the respective method is carried out. The digital storage medium can therefore be computer-readable. Some example embodiments according to the disclosure therefore comprise a data medium which has electronically readable control signals which are capable of interworking with a programmable computer system in such a way that one of the methods described herein is carried out.

Example embodiments of the present disclosure can generally be implemented as a computer program product with a program code, wherein the program code is effective in carrying out one of the methods when the computer program product runs on a computer. The program code can also be stored, for example, on a machine-readable medium.

Other example embodiments comprise the computer program for carrying out one of the methods described herein, wherein the computer program is stored on a machine-readable medium.

In other words, one example embodiment of the method according to the disclosure is therefore a computer program which has a program code to carry out one of the methods described herein when the computer program runs on a computer. A further example embodiment of the method according to the disclosure is therefore a data medium (or digital storage medium or a computer-readable medium) on which the computer program to carry out one of the methods described herein is recorded.

A further example embodiment of the method according to the disclosure is therefore a data stream or a sequence of signals which represent(s) the computer program to carry out one of the methods described herein. The data stream or the sequence of signals may, for example, be configured in such a way as to be transferred via a data communication connection, for example via the Internet.

A further example embodiment comprises a processing device, for example a computer or a programmable logic component which can be configured or adapted in such a way as to carry out one of the methods described herein.

A further example embodiment comprises a computer on which the computer program to carry out one of the methods described herein is installed.

In some example embodiments, a programmable logic component (for example a field-programmable gate array, an FPGA) can be used to perform some or all functionalities of the methods described herein. In some example embodiments, a field-programmable gate array can interwork with a microprocessor to carry out one of the methods described herein. In some example embodiments, the methods are generally carried out by any given hardware device. This may be universally usable hardware such as a computer processor (CPU) or hardware specific to the method, such as, for example, an ASIC.

The example embodiments described above merely represent an illustration of the principles of the present disclosure. Modifications and variations of the arrangements and details described herein will obviously be evident to other persons skilled in the art. The disclosure is therefore intended to be limited only by the scope of protection of the patent claims set out below, and not by the specific details that have been presented by way of the description and the explanation of the example embodiments herein.

What is claimed is:

1. A device, comprising:
a receiver configured to receive a data packet from a communication partner;
a data processor configured to process the data packet to obtain a predetermined value;
an authenticator configured to receive a challenge message and to use the predetermined value to generate a response message; and
a transmitter configured to transmit a transmit message comprising the response message, which is used by the communication partner to authenticate the device,
wherein the predetermined value is obtained directly via the data processor processing the data packet to extract the predetermined value therefrom without the data processor additionally storing the predetermined value in a memory accessible by the device that is separate from the data processor.

2. The device as claimed in claim 1, wherein the data processor is configured to obtain the predetermined value via (i) executing a predetermined function associated with the predetermined value, (ii) executing an encryption function using a key, or (iii) executing an decryption function using the key.

3. The device as claimed in claim 1, wherein the predetermined value comprises an initial value for generating a private key of an authentication operation, and
wherein the device is configured to use the private key to generate at least a part of the transmit message.

4. The device as claimed in claim 3, wherein the authentication operation comprises an asymmetric encryption operation or a signature operation.

5. The device as claimed in claim 1, wherein the device further comprises:
a non-volatile memory having memory cells that are permanently programmed such that contents of the non-volatile memory cannot be altered.

6. The device as claimed in claim 1, further comprising:
a data memory configured to provide a key for the data processor,
wherein the receiver is configured to receive a selection message, and
wherein the device is configured to modify the key in response to the selection message.

7. The device as claimed in claim 1, wherein the receiver is configured to receive a selection message, and further comprising:
one or more processing logic circuits configured to provide a plurality of variants of a logic function for processing the data packet; and
a selector configured to end the use of a first variant of the logic function for processing and to begin the use of a second variant of the logic function for processing in response to the reception of the selection message.

8. The device as claimed in claim 1, wherein the receiver is configured to receive a selection message, and further comprising:
one or more authentication logic circuits configured to provide a plurality of variants of a logic function for authenticating the communication partner; and
a selector configured to end the use of a first variant of the logic function and to begin the use of a second variant of the logic function in response to the reception of the selection message.

9. The device as claimed in claim 8, wherein the selector is configured to receive, evaluate, and verify the selection message, and to end the use of the first variant of the logic function and to begin the use of the second variant of the logic function only if the authentication of the communication partner is successful.

10. The device as claimed in claim 9, wherein the selector is configured to determine a hash value based on the selection message using a hash function, and (i) classify the authentication of the communication partner as successful if the hash value corresponds to a predetermined hash value and/or lies within a predetermined hash value range, or (ii) classify the authentication of the communication partner as unsuccessful if the hash value does not correspond to the predetermined hash value.

11. The device as claimed in claim 1, wherein the receiver, the data processor, the authenticator, and the transmitter are configured in accordance with a hardware obfuscation technique to impede reverse engineering attempts.

12. The device as claimed in claim 1, wherein the data packet comprises an encrypted data packet, and
wherein the data processor is configured to process the data packet by decrypting the encrypted data packet to obtain the predetermined value such that the predetermined value is not transmitted in unencrypted form between the device and the communication partner.

13. The device as claimed in claim 1, wherein the authenticator is configured to generate the response message directly from the predetermined value obtained from the data packet without storing the predetermined value in a memory accessible by the device that is separate from the data processor.

14. A device for authenticating a communication partner, comprising:
a data memory configured to separately store a data packet and a key;
a data interface configured to exchange messages with the communication partner;
a control device configured to read the data packet from the data memory and to transmit the data packet via the data interface to the communication partner; and
an authenticator configured to receive, from the communication partner via the data interface, a message comprising authentication information and being generated by the communication partner using a predetermined value contained in the data packet, and to verify a validity of the authentication information with reference to the data packet using the key to obtain an authentication result,
wherein the device is configured to perform a further interaction with the communication partner depending on the authentication result, and
wherein the predetermined value is obtained directly by the communication partner via processing the data packet to extract the predetermined value therefrom without a data processor of the communication partner additionally storing the predetermined value in a memory accessible by the communication partner that is separate from the data processor.

15. The device as claimed in claim 14, wherein the key comprises a public key of an authentication operation, and
wherein the device is configured to verify the authentication information without utilizing information associated with a private key of the authentication operation.

16. The device as claimed in claim 14, wherein the authenticator is configured to transmit a challenge message to the communication partner via the data interface, and to receive the message as a response message that is associated with the challenge message that is generated using a private key of an authentication operation, and
wherein the key is a public key of the authentication operation associated with the private key.

17. The device as claimed in claim 16, wherein the private key is generated using the predetermined value that is obtained from the data packet.

18. The device as claimed in claim 14, wherein the data interface is configured to transmit a selection message containing an instruction to the communication partner to perform at least one of (i) modifying a key for processing the data packet in response to the selection message, (ii) ending the use of a first variant of a logic function for processing the data packet and beginning the use of a second variant of the logic function for processing the data packet in response to the reception of the selection message, or (iii) ending the use of a first variant of a logic function for authentication and beginning the use of a second variant of the logic function for authentication in response to the reception of the selection message.

19. The device as claimed in claim 14, wherein the data packet comprises an encrypted data packet, and
wherein the communication partner processes the data packet by decrypting the encrypted data packet to obtain the predetermined value such that the predetermined value is not transmitted in unencrypted form between the device and the communication partner.

20. A method, comprising:
arranging a receiver for receiving a data packet from a communication partner;
arranging a data processor that is configured to process the data packet to obtain a predetermined value;
arranging a transmitter; and
arranging an authenticator that is configured to receive a challenge message to use the predetermined value to generate a response message such that the transmitter transmits a transmit message that comprises the response message, which is used by the communication partner to perform authentication of a device transmitting the transmit message,
wherein the predetermined value is obtained directly via the data processor processing the data packet to extract the predetermined value therefrom without additionally storing the predetermined value in a memory accessible by the device that is separate from the data processor.

21. A method, comprising:
arranging a data memory that is configured to separately store a data packet and a key;
arranging a data interface that is configured to exchange messages with a communication partner;
arranging a control device that is configured to read the data packet from the data memory and to transmit the data packet to the communication partner via the data interface;
arranging an authenticator that is configured to receive a message containing authentication information from the communication partner via the data interface, the message being generated by the communication partner using a predetermined value contained in the data packet and to verify a validity of the authentication information for correspondence with the data packet using the key to obtain an authentication result; and
authenticating the communication partner and performing a further interaction with the communication partner depending on the authentication result,
wherein the predetermined value is obtained directly by the communication partner via processing the data packet to extract the predetermined value therefrom without a data processor of the communication partner additionally storing the predetermined value in a memory accessible by the communication partner that is separate from the data processor.

22. The method as claimed in claim 21, further comprising:
storing, in the data memory, device-specific or group-specific data packets associated with a group of devices or a device, respectively, each being stored with an associated key.

23. A method for producing a plurality of devices, comprising:
configuring each one of the plurality of devices to (i) separately store a data packet and an associated key, and (ii) perform an authentication of a communication partner via a transmission of the data packet to the respective communication partner, the data packet being used by a respective communication partner to generate, using a predetermined value contained in each respectively transmitted data packet, a message comprising authentication information; and
verifying, via each one of the plurality of devices, a validity of the authentication information received from a respective communication partner for correspondence with the respective data packet using the respective key,
wherein different data packets and keys are stored in each of the plurality of devices on a device-specific or a group-specific basis, and
wherein the predetermined value is obtained directly via each respective communication partner processing the data packet to extract the predetermined value therefrom without a data processor of each respective communication partner additionally storing the predetermined value in a memory accessible by the respective communication partner that is separate from the data processor.

24. The method as claimed in claim 23, wherein when the predetermined value contained in a respective data packet of one of the plurality of devices is transferred onto an unauthorized clone of a communication partner, a positive authentication result is generated for at most the device or a group of devices from among the plurality of devices when the clone is used.

25. A method, comprising:
receiving a data packet from a communication partner;
receiving a challenge message;
processing the data packet to obtain a predetermined value;
using the predetermined value to generate a response message; and
transmitting a transmit message to the communication partner such that the transmit message comprises information based on the predetermined value and the response message, which is used by the communication partner to perform authentication of a device transmitting the transmit message, wherein the predetermined value is obtained directly via the processing of the data packet to extract the predetermined value therefrom without a data processor of the device additionally storing the predetermined value in a memory accessible by the device that is separate from the data processor.

26. A method for authenticating a communication partner, comprising:

reading a data packet from a data memory;

reading a key from the data memory that is separate from the data packet;

transmitting the data packet to the communication partner;

receiving a message comprising authentication information from the communication partner, the message being generated by the communication partner using a predetermined value contained in the data packet;

verifying a validity of the authentication information using the key to obtain an authentication result; and performing a further interaction with the communication partner depending on the authentication result, wherein the predetermined value is obtained directly by the communication partner via processing the data packet to extract the predetermined value therefrom without a data processor of the communication partner additionally storing the predetermined value in a memory accessible by the communication partner that is separate from the data processor.

27. An authentication method, comprising:

reading a data packet from a data memory;

reading a key from the data memory;

transmitting the data packet from a device to a communication partner;

transmitting a challenge message to the communication partner;

processing the data packet via the communication partner to obtain a predetermined value;

using the predetermined value to generate a response message;

transmitting a message comprising authentication information based on the predetermined value and the response message to the device via the communication partner;

verifying a validity of the authentication information via the device using the key to obtain an authentication result; and performing a further interaction between the device and the communication partner depending on the authentication result, wherein the predetermined value is obtained directly via the communication partner processing the data packet to extract the predetermined value therefrom without a data processor of the communication partner additionally storing the predetermined value in a memory accessible by the communication partner that is separate from the data processor.

28. A non-transitory computer-readable medium having instructions stored thereon that, when executed by one or more processors of a device, cause the device to:

receive a data packet from a communication partner;

receive a challenge message;

process the data packet to obtain a predetermined value;

use the predetermined value to generate a response message; and transmit a transmit message to the communication partner such that the transmit message comprises information based on the predetermined value and the response message, which is used by the communication partner to perform authentication of the device, wherein the predetermined value is obtained directly via the processing of the data packet to extract the predetermined value therefrom without additionally storing the predetermined value in a memory accessible by the device that is separate from the one or more processors.

* * * * *